(No Model.)
W. A. KENDALL & F. R. GLOVER.
THILL COUPLING.
No. 310,207. Patented Jan. 6, 1885.
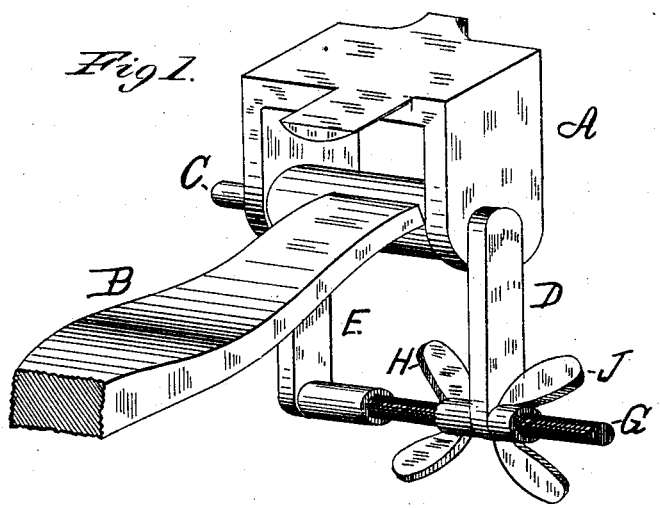
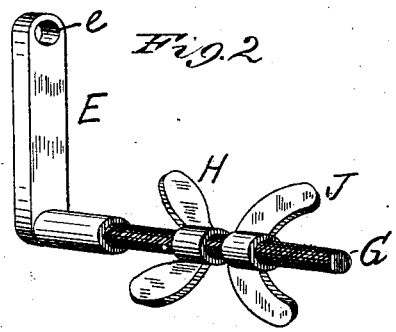
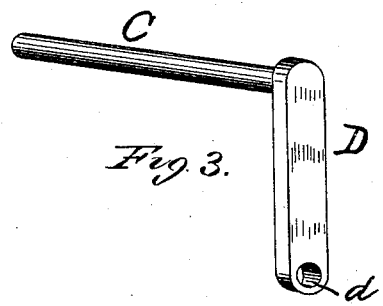
Witnesses.
Gabriel J. W. Gabriel
Wm E. Richards
Inventors
Wallace A. Kendall
Frank R. Glover
By Richards
Attorneys.

UNITED STATES PATENT OFFICE.

WALLACE AMASA KENDALL AND FRANK ROBERT GLOVER, OF FRAMINGHAM, MASSACHUSETTS.

THILL-COUPLING.

SPECIFICATION forming part of Letters Patent No. 310,207, dated January 6, 1885.

Application filed July 31, 1884. (No model.)

*To all whom it may concern:*

Be it known that we, WALLACE AMASA KENDALL and FRANK ROBERT GLOVER, citizens of the United States, residing in Framingham, county of Middlesex, and State of Massachusetts, have invented certain new and useful Improvements in Thill-Couplings, of which the following is a specification.

Our invention consists in a novel construction of a bolt for holding the thill-iron in place in the clip or shackle, a bar serving instead of a nut for said bolt, and a screw-threaded bolt or shank for holding the parts in place, as hereinafter more particularly described.

In the accompanying drawings, Figure 1 is a perspective view of our invention in position for use. Figs. 2 and 3 are detail views.

A represents the clip or shackle attached to the axle-tree of a vehicle, and B the thill-iron, both of which are of the usual or any suitable construction and adapted to be secured to the axle-tree in any suitable manner.

C represents the bolt, at one end of which is an arm, D, extending at a right angle therefrom and having a hole, $d$, near its outer end.

E is a bar similar in shape and dimensions to the arm D, and having near one end a hole, $e$. At the other end is a screw-threaded bolt, G, adapted to pass readily through the hole $d$ in the arm D.

In applying the invention the thill-iron B is placed in position in the clip, between the jaws or ears thereof. The bolt C is then passed through the jaws or ears of the clip and through the eye of the thill-iron, so that the arm D lies flat against one of the ears and the end of the bolt projects beyond the other ear. The bar E is then placed in position, so that the end of the bolt C will pass through the hole $e$, and the screw-threaded bolt G will pass through the hole $d$ in the arm D. A thumb-nut, H, is placed on the screw-threaded bolt G before passing it through the hole $d$, and another thumb-nut, J, is placed on the bolt outside of the arm D. By means of the inner thumb-nut, H, the bolt is adjusted to suit the dimensions of the clip and thill-iron, and by means of the outer thumb-nut, J, the parts are held securely in position.

This invention provides for readily attaching and detaching the thills to and from the clips in order to change from thills to pole, or vice versa, without the necessity for using a wrench, pinchers, or other tool, as the thumb-nuts are easily worked by the thumb and fingers. Moreover, as the thumb-nuts have a tendency to work toward each other on each side of the arm D, there is no danger of displacement from the loosening of the nuts.

The invention is applicable to clips placed in any position, either on the upper, lower, or forward side of the axle-tree.

Having thus described our invention, what we claim as new, and desire to secure by Letters Patent, is—

1. As an improved article of manufacture, a thill-coupling consisting of a bolt, C, having an arm or extension, D, provided with a hole, $d$, and a bar, E, having at one end a hole, $e$, for engagement with the end of the bolt C, and at the other end a screw-bolt, G, for engagement with the hole $d$ in the arm D, substantially as herein described.

2. The thumb-nuts H J, in combination with the arm D and screw-bolt G, substantially as and for the purpose herein described.

In witness whereof we have hereunto set our hands this 6th day of June, 1884.

WALLACE AMASA KENDALL.
FRANK ROBERT GLOVER.

In presence of—
JOHN CLARK,
ENOS H. BIGELOW.